(12) United States Patent
Majer (10) Patent No.: US 8,945,647 B2
(45) Date of Patent: *Feb. 3, 2015

(54) PROCESS AND AN APPARATUS FOR PREPARING A BEVERAGE UNDER CONTROLLED PRESSURE CONDITIONS

(71) Applicant: Tuttoespresso S.r.l., Origgio (IT)

(72) Inventor: Luca Doglioni Majer, Carate Urio (IT)

(73) Assignee: Tuttoespresso S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,679

(22) Filed: Dec. 27, 2012

(65) Prior Publication Data

US 2013/0115350 A1  May 9, 2013

Related U.S. Application Data

(62) Division of application No. 12/281,625, filed as application No. PCT/IB2007/000806 on Mar. 28, 2007, now Pat. No. 8,367,136.

(30) Foreign Application Priority Data

Mar. 28, 2006  (EP) ..................................... 06006430
Aug. 3, 2006   (EP) ..................................... 06016214

(51) Int. Cl.
*A47J 31/36*  (2006.01)
*A47J 31/00*  (2006.01)

(52) U.S. Cl.
CPC ............... *A47J 31/002* (2013.01); *A47J 31/36* (2013.01); *A47J 31/3666* (2013.01)
USPC ............... 426/431; 99/302 R; 99/283; 99/280

(58) Field of Classification Search
USPC .................................. 426/431; 99/302 R, 283
See application file for complete search history.

(56) References Cited

U.S. PATENT DOCUMENTS

| 4,806,375 A | 2/1989 | Favre |
| 5,762,987 A * | 6/1998 | Fond et al. ..................... 426/433 |
| 6,382,083 B2 | 5/2002 | Schmed |
| 6,405,637 B1 | 6/2002 | Cai |
| 6,488,976 B1 * | 12/2002 | Priley ............................ 426/435 |
| 2001/0018866 A1 | 9/2001 | Fischer |
| 2006/0255064 A1 * | 11/2006 | Donaldson ...................... 222/95 |

FOREIGN PATENT DOCUMENTS

| DE | 4240429 A1 | 6/1994 |
| EP | 0250810 | 6/1990 |
| EP | 0870457 A | 10/1998 |
| EP | 0978245 A | 2/2000 |
| EP | 1 929 905 A1 | 6/2008 |
| JP | 3-39112 * | 2/1991 |
| WO | WO 2005/063095 A1 | 7/2005 |

OTHER PUBLICATIONS

International Preliminary Report on Patentability issued Aug. 11, 2008 in PCT/IB2007/000806, filed Mar. 28, 2007.
European Search Report issued Nov. 4, 2011 in European Patent Application No. 11003190.3.

* cited by examiner

*Primary Examiner* — Anthony Weier
(74) *Attorney, Agent, or Firm* — Oblon, Spivak, McClelland, Maier & Neustadt, L.L.P.

(57) ABSTRACT

A process of preparing a beverage from a beverage preparation chamber includes feeding water to the preparation chamber until a first pressure is reached, interrupting the flow of water to the preparation chamber, holding the preparation chamber in a closed condition for a first time interval, opening the outlet of the preparation chamber and delivering the thus prepared beverage.

17 Claims, 3 Drawing Sheets

PROCESS AND AN APPARATUS FOR PREPARING A BEVERAGE UNDER CONTROLLED PRESSURE CONDITIONS

CROSS-REFERENCE TO RELATED APPLICATIONS

This application is a divisional of U.S. application Ser. No. 12/281,625, filed Nov. 7, 2008, now U.S. Pat. No. 8,367,136, which is incorporated herein by reference in its entirety. U.S. application Ser. No. 12/281,625 is a U.S. national stage application under 35 U.S.C. §371 of International Application No. PCT/IB2007/00806 filed Mar. 28, 2007, which claims priority to European Application Nos. 06006430.0 filed Mar. 28, 2006 and 06016214.6 filed Aug. 3, 2006.

The present invention relates to a process and an apparatus for preparing a beverage under controlled pressure conditions. More particularly, this invention relates to beverage systems using preparation chambers containing minced, ground or soluble products for the preparation of hot beverages such as coffee, tea, herbal remedies or the like in dispensing machines.

Beverage dispensing machines are widely known and used. These machines are divided into two main groups: a first group make use of disposable containers of edible products, called pods, cartridges or cartridges, that contain the ground, leaf or soluble product to be brewed or dissolved into hot water. The cartridges are disposed after having being used. The second group machines make use of a brewing chamber, usually comprising one or two pistons, where the coffee powder (or other starting material) is brewed. After the infusion or brewing step, the remaining material is disposed.

There has been a constant search for a better extraction/solubilization step and for a better and constant quality of the obtained beverage.

A known method to try to improve extraction by infusion is to carry out a wetting of the coffee or other material to be extracted before the actual extraction step with pressurized hot water. This is disclosed e.g. in EP0870457, where a flexible water impermeable pod (sachet) is positioned in a chamber provided with fixed pointed means suitable to perforate the pod material once this is pressurized and biased against the chamber walls and the perforating means. According to this document, water is fed to the pod and the flow of water is interrupted before reaching a pressure sufficient to cause the perforation of the pod walls: in other words, the flow of water to the pod is stopped before it is pressurized.

WO02/076270 in the name of Tuttoespresso describes a unit system for the preparation of a beverage from a soluble product contained in a disposable cartridge that is comprising a collecting device with a housing means designed to contain the cartridge, wherein at least one throttling arrangement is provided along the flow of the beverage leaving the cartridge.

In WO04/030500, in the name of Tuttoespresso, the outlet is closed by using a perforating rod that has a diameter similar or greater than the diameter of the outlet opening in order to keep the outlet opening substantially closed during the hot water feeding step.

Closed cartridges that open upon reaching a sufficient pressure are also well known in the art.

U.S. Pat. No. 5,242,702 in the name of Nestec discloses a plastic cartridge wherein the bottom is broken open by the pressure build-up that occurs upon feeding hot water to the cartridge, with the help of a puncturing means that opens the bottom of the cartridge towards the inside.

WO2005080223, in the name of Tuttoespresso, discloses a single serve cartridge having an outlet lid portion located on a dispensing wall to form a dispensing opening after a liquid has been introduced into the cartridge, that breaks open upon pressurizing the cartridge with hot water. According to this embodiment, the outlet has portions opening towards the outside of the cartridge to let out the beverage.

EP-A-1595817 in the name of ITACA relates to a method wherein a special knurled-surface cartridge is pressurized by feeding hot water and "the pressurization of the water and of the inside of the cartridge is maintained until the breakable portions break because of the pressure".

EP-A-1364605, in the name of Sagliaschi et al. discloses a method of preparing a beverage in a hard plastic cartridge that can resist deformation when pressurized by feeding hot water under pressure to said cartridge. Feeding of hot water is continued for an amount of time depending on the type of beverage and controlled by a timer. Eventually a piercing element perforates the bottom of the pressurized cartridge to release the beverage. In order to withstand the increasing pressure, the cartridge is made of hard rigid plastic with a thickness "calculated to make sure that the container has the necessary rigidity to withstand high pressure for long periods of time" (see para. 0034). Moreover, the cartridge has to be housed within a "watertight container" (para. 0057) to avoid the cartridge being deformed by the increasing pressure in the pressurization step.

The above methods, therefore, require that hot water is fed to the cartridge and that this pressurizing step is continued at least until an outlet is produced. During the time that is required between the start of the water feeding step and the breaking or piercing of the bottom or the forming of the opening, the coffee powder is extracted or dissolved.

These methods have several drawbacks.

The main problem with these methods is that the infusion or brewing time is depending on the pressure of the water within the cartridge, on the characteristics of the cartridge material, its manufacturing method and on the design of the cartridge outlet opening. The infusion/brewing time is therefore a variable rather than a constant; e.g. it was found that even minor changes in the cartridge material composition or in the pump efficiency or in the cartridge design would result in a different outcome of the beverage characteristics.

Therefore, the efficiency of the brewing and extraction step is also a variable and random feature of the beverage preparation.

This is true also in the case of above discussed EP-A-1364605, because a thinner area of the bottom of the cartridge is required to form the outlet opening, this thinner area being subject to possible early opening.

In order to overcome this problem it was proposed to control the flow rate of the beverage from the brewing/infusion chamber. Such a method is disclosed e.g. in U.S. Pat. No. 6,382,083, wherein a valve body is positioned at the outlet of a brewing chamber, and in EP application 04031014.6 wherein several parameters are varied to control the flow rate of the beverage from the infusion/brewing chamber. Still, these methods have not completely solved the above mentioned problem, the remaining variable parameters jeopardizing the reliability of the overall results.

Still another problem is to improve the extraction of materials that have a granulometry relatively high, such as e.g. ground coffee for the so-called "American" or "regular" coffee or camomile and other herbal remedies. In fact, for these types of materials it is not possible to use high extraction pressures, as are used for the espresso coffee, where the finely ground coffee particles provide a resistance sufficient to increase the dispensing pressure to 8-9 bar.

Therefore, there is the need for an improved process and apparatus for preparing and dispensing beverages, particularly hot beverages, in an easy, reliable, cost-effective way. There is also the need to improve the existing processes without having to re-design the existing cartridges and apparatuses. There is also the need to make extraction processes less dependent on the nature of the material to be extracted by brewing.

It is an object of the present invention to solve the above mentioned problems and provide an improved beverage preparing process and apparatus that can give excellent beverage.

Accordingly, the present invention provides a process of preparing a beverage according to claim 1.

The pressure to which reference is made in this description, unless otherwise specified, is the pressure measured in the hydraulic circuit, e.g. by pressure detectors located on said circuit so as to be hydraulically connected with the brewing chamber or cartridge, as disclosed hereinafter.

The pressure during the above mentioned holding step, or each of said steps, is at least 3 bar and preferably is at least 5 bar; preferably in the range of 5 to 18 bar and most preferably 5 to 12. This pressure (referred to as first pressure or P1) remains substantially constant for a time of 1 to 60 seconds, because the preparation chamber, i.e. the cartridge or brewing chamber, is rigid and is closed. The flow of water to the preparation chamber is preferably resumed for delivering the required amount of beverage, especially if the preparation chamber is a brewing chamber containing e.g. ground coffee to be brewed.

The interruption of the flow of water to the preparation chamber can be repeated (after having resumed the said flow): thus the invention provides for a method wherein the flow of water to the preparation chamber is interrupted at least once (and resumed) while the preparation chamber is still closed. The resumption step, too, can be repeated, i.e. several interruption and resumption steps are carried out; in this case, after reaching the first pre-brewing pressure P1 and having interrupted the flow of water for a "pressure holding time, the resumption step can result in maintaining said first pressure P1 or in an increase of the pressure to pressure P2. The pressure P2 is then held for another holding time at the end of which another resumption step can be carried out; the pressure P2 can be increased again, in a stepwise pressure increasing profile. Alternatively, the water is fed for very short times during the resumption steps so as to maintain a substantially constant pressure—or a pressure increasing very slightly, e.g. not more than 5%, maximum 10%—within the cartridge or brewing chamber.

According to a first embodiment of the invention, the first pressure, i.e. the pressure of the pressure holding step(s) is lower than the opening pressure of the preparation chamber, i.e. the pressure at which the preparation chamber is open. In other words, the invention method provides for reaching a first pressure value (within the apparatus hydraulic circuit), interrupting at least once the flow of water to the chamber, to hold the chamber substantially at that pressure and then feeding again water to the preparation chamber to reach a second pressure, i.e. the pressure required for the opening of the cartridge. The pressure when the chamber is open can be, and usually is, different from the pressure during the step of dispensing the beverage.

According to another embodiment of the invention, pressure during said pressure holding step, i.e. during said step of interruption of the water flow to the chamber, is reduced and then increased again at least once.

The pressure profile of the beverage dispensing step is chosen according to the material provided in the preparation chamber, i.e. in the cartridge or in the brewing chamber, to give the best extraction mode in view of the required final product. This selection of the delivery pressure profile can be independent on the presence of a pressure holding step before opening the preparation chamber.

Thus, the first pressure P1 of the water interruption step, or pressure holding step, or the final pressure (e.g. P2) that is held for a time period, can be higher, equivalent or lower than the pressure during the beverage dispensing step: e.g. in chamomile preparation the cartridge is held and opened at a first pressure P1 of 12 bar, the pressure drops and the beverage is dispensed, after resuming the flow of water, at a pressure of 2 bar.

The invention also relates to a beverage dispensing apparatus, comprising a beverage preparation chamber including an outlet and means for feeding water to said preparation chamber and reach a preset pressure, characterized in further comprising means for interrupting said water flow to said preparation chamber and for resuming said water flow after a preset time has elapsed.

The preparation chamber, as above mentioned, is a rigid cartridge or a brewing chamber; if no pods are used and the coffee is directly fed to the brewing chamber, the chamber is comprising at least one piston, according to the apparatus type.

If the chamber is a cartridge, or pod, it will be closed, apart for the water inlet means, during the pressure forming step and the pressure holding step. The cartridge is usually opened either by a further increase of pressure, that will result in a breaking of the outlet, by a piercing member, a perforator or similar means or by the combination of the two.

The first pressure reached in the cartridge, i.e. the pressure of the pre-brewing step, or pressure-holding step, is such as not to generate an opening in any way; after the pressure-holding step has been performed for the time required, a second pressure is then obtained, such as to deform the cartridge and generate the outlet opening for delivering the beverage.

If the chamber is a brewing chamber obtained in a cylinder and defined by at least one piston, the opening outlet will be closed and open by closing means such as valve means. Suitable brewing chambers provided with a valve means are e.g. the brewing chambers disclosed in U.S. Pat. No. 6,382,083 and in the prior art therein discussed, relating to valve elements that close the brewing chamber outlet against the flow of the water through the brewing chamber and that can be opened to dispense the beverage.

The beverage dispensing process and apparatus according to the present invention results in a number of advantages.

The extraction process can be set and controlled and is therefore more reliable: this results in a constant and higher quality of the beverage.

The extraction process is more complete, because during the holding time, i.e. the time during which the cartridge is held under pressure, without feeding water to it, the water can not only wet the beverage material, but, in the case of ground coffee, can also better penetrate the ground coffee particles pores and better extract the aromas, the flavours and all compounds that give or that help to give the coffee beverage extracted under pressure outstanding organoleptic characteristics. Namely, it is believed that the improved extraction method of the invention also results in an improved extraction of coffee fibers in the form of Soluble Dietary Fiber (SDF) and related phenolic and aroma forming compounds bound to the fibers (J. Agric. Food Chem., 2007, 55 (5) and Scientific American, Weekly Review, Mar. 20, 2007).

The extraction pressure (i.e. the first pressure, at which pumping of water to the brewing chamber is discontinued) to be used in the invention method is within the range of 3 to 20 bar and preferably of 5 to 15, even a relatively low pressure is very effective: when a pressure comprised e.g. within the range of 5 to 10 bar is used in the pressure holding step, the method provides excellent extraction. Thanks to this, a traditional cartridge can be used in a traditional coffee machine, without having to resort to the heavy, thick and rigid cartridge of EP-A-1364605. Also, standard and not expensive pumps, e.g. those already known in the art for this purpose, can be used.

Another advantage is that all the ground coffee or other material, in the preparation chamber will be impregnated with hot water: this will result in a dramatic reduction and even in the absence of preferred paths for the extraction water during the beverage dispensing step.

A further advantage is that the flow rate of the beverage from the preparation chamber becomes less critical to the beverage quality because a good part of the extraction step is carried out during the pressure holding step (i.e. the pre-brewing with a pressure of at least 3 bars with closed brewing chamber).

On a different perspective, the invention can be used to perform a pre-brewing phase including one or several holding patterns, so that the subsequent brewing will be performed at a pressure set and known before the brewing in view of the product nature (coffee, camomile, tea etcetera) and characteristics (e.g. porosity). The dispensing pressure, therefore, may be higher, equivalent or lower that the pre-brewing holding pressure.

In other words, thanks to the invention it is possible to carry out said pre-brewing step at 12 bar in a closed brewing chamber for e.g. 5 seconds and then open the cartridge (or chamber) and dispense the coffee at a lower pressure of e.g. 6 bar: the obtained beverage will benefit of the improved extraction deriving from the pre-brewing step at 12 bar.

The invention will now be disclosed in greater detail with reference to the attached non limiting drawings, wherein.

The present invention is used with a beverage preparation chamber containing a material such as ground coffee, leaf tea, herbal remedies, granulated milk, or with soluble products such as coffee, chocolate or pre-mixed cappuccino or lemon tea powders as well as concentrated fruit juices, artificial or natural flavouring agents, dressing powders such as cinnamon and similar products.

As previously explained, the wording beverage preparation chamber applies to apparatuses using rigid cartridges and to apparatuses having a brewing chamber; the brewing chamber is rigid and may contain a flexible pod or loose ground material. In the latter case, the brewing chamber, known in the art, is conventionally comprising a cylinder and at least a piston, for brewing coffee or other beverages.

Figure 1:
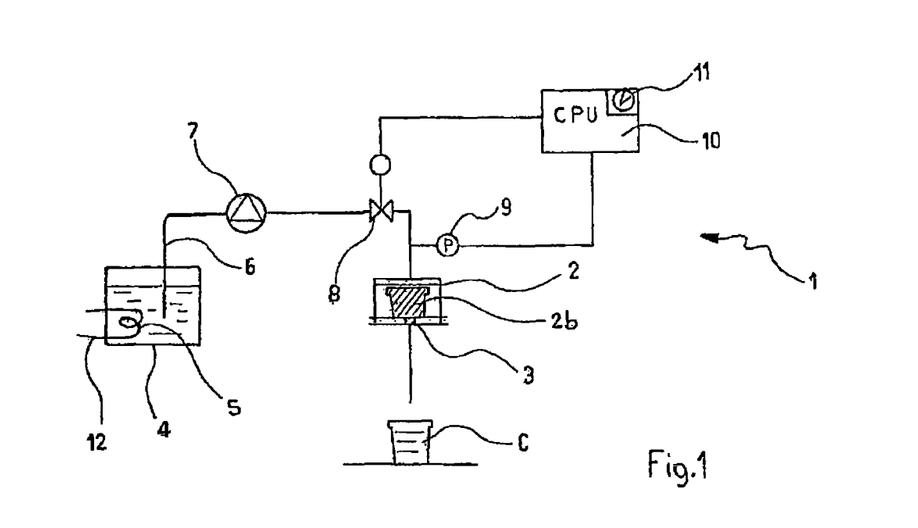
FIG. 1 is a schematic layout of an apparatus according to the invention.

With reference to FIG. 1, the beverage dispensing apparatus 1 comprises a beverage preparation chamber 2, including an outlet 3, containing the ingredient. In the shown embodiment the chamber is a cartridge 2b. The apparatus comprises in a way known per se means for feeding water to chamber 2 that include a water container 4 and a line 6 that reach chamber 2. A pump 7 is provided on line 6. Downstream of pump 7 is provided a valve 8 and a pressure detector 9 that is thus able to detect the pressure within the hydraulic circuit of the apparatus. As previously mentioned, the pressure referred to in description and claims refers to pressure measured in the hydraulic circuit, e.g. by detector 9.

Both the valve and the pressure detector are connected to a control unit 10, such as a CPU or a similar means. A timer 11 is included in or connected to control unit 10; control unit comprises, or is, a computerized or programmable unit set to operate the invention apparatus, including the pump and the valve means, according to the invention method, i.e. by interrupting the flow of water to the preparation chamber and preferably resuming it before or after the chamber is opened in order to deliver the beverage to the cup.

Heating means may be provided to control the water temperature.

For example, using heated water, according the present invention, the process of preparing a beverage, e.g. a coffee, provides that water heated by heating means 12 in water tank 4 is fed through pump 7 and valve 8 to the cartridge 2b acting as beverage preparation chamber. The cartridge outlet (or the chamber outlet when no cartridge is used) is initially closed.

Hot water feeding is continued until a first pressure value P1 is reached within the chamber 2 and detected by pressure detector 9. This first pressure is generally within the range of 3 to 20 bar and preferably of at least 5 bars, most preferably in the range of 5 to 15 bar. Once the required first pressure P1 is reached and detected, pump 7 is stopped, or valve 8 is closed, or both things together.

The required pressure must not necessarily be detected with a pressure detector. The same effect, i.e. the fact that the material in the preparation chamber is all impregnated with water under pressure, can be reached by e.g. two other ways: by feeding a preset volume of water to the chamber (sufficient to generate and maintain the required pressure for the required time) or by operating the water pump for a preset time length (sufficient to feed enough water to generate and maintain the required pressure for the required time).

The cartridge, or the brewing chamber, is then held in this pre-brewing and extraction condition (pressure-holding step) for a time $t_1$ that is usually within the range of 1 to 60 seconds, preferably 2 to 40 seconds and most preferably of 3 or 4 to 15 seconds. A preferred time length is of 5 or 6 seconds.

In this pressure holding step, the chamber is still closed and the content of the preparation chamber is therefore kept in a pressurized container (chamber or cartridge) together with the water, i.e. with the extraction means. During this step the water will not only wet but also penetrate the particles of the ingredient, or material, present in the chamber, thus obtaining an excellent dissolution or extraction of the ingredient. In other words, it is believed that by holding the ingredient particles at a pressure of at least 3 bars for the said time (e.g. 1 to 60 sec) the water can uniformly wet the ingredient and penetrate and impregnate the particles, reaching the compounds located inside their cavities. This sequence can be repeated several times; if the apparatus is used to dispense a beverage, the total amount of time will be within the total amount of time as above specified in order to avoid that the dispensing time is too long. If the method is used industrially to improve the known extraction processes, the total amount of time could be greater.

At the end of the pressure-holding step or steps, e.g. after 20 seconds, pump 7 is started again, valve 8 is open and the flow of water to the chamber is resumed. Alternatively, the cartridge is opened without resuming the water flow.

The opening and beverage dispensing step can be carried out at said first pressure P1 (that in this case would be e.g. 12 to 17 bar) or at a pressure higher or lower than the first pressure P1, before or after the chamber is opened. The opening of the chamber to deliver the prepared beverage is carried out according to the chamber features and can be a result of the increase of the pressure in the chamber or can be operated mechanically. A combination of the two features is also possible. In a brewing chamber provided with a valve means, the valve means opening step is operated via a control unit, piezo-electrically.

When the chamber is opened, a drop of pressure will usually occur; as a result of the pressure drop, removal of water (or other substance impregnating the particles) penetrated into the coffee ground particles together with the aromas is performed.

The thus prepared beverage is then delivered to the final cup or container C.

In another embodiment of the invention, the control of the interruption is carried out by a timer, i.e. without making use of the pressure detector to this purpose. Such apparatus is disclosed in FIG. 2, where the same numeral references have been used for the same components. In this apparatus, a water tank 13 is connected to pump 7 by a line on which a flow-meter 14 is mounted. Pump 7 is connected to a three-way valve 15 having a duct connected to a drip tray 16; two single valves could be used instead of valve 15. In the shown embodiment, valve 15 is connected to water heating means 17, e.g. provided with an electric resistance 12, that is connected to preparation chamber 2; it is clear that a location of valve 15 between heating means 17 and preparation chamber 2 is also within the scope of the invention, in this embodiment and in the embodiments discussed hereinafter. Chamber 2 may be or house a cartridge or can be of the piston-cylinder defined type.

Figure 2:
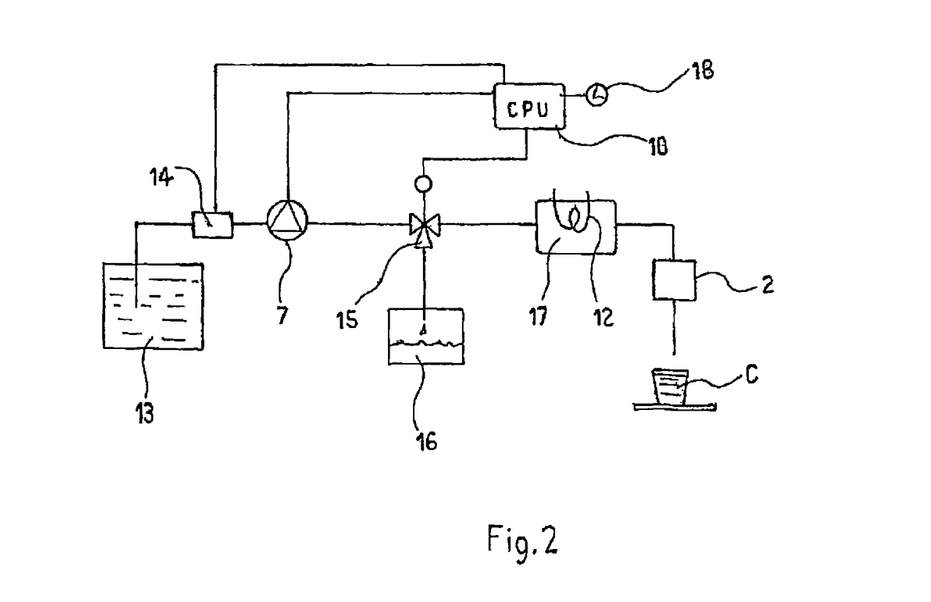
FIG. 2 is another schematic layout of an apparatus according to the invention.

In this embodiment, the pump is operated by control unit 10 according to the time detecting unit 18 as follows.

In the first step valve 15 is opened to connect pump 7 to heater 17 and close duct to drip tray 16, and pump 7 is started; the time detecting means 18 begins measuring the lapsing time. The flow-meter 14 detects and regulate the amount of fed by the pump to the preparation chamber 2, in order to reach the required first pressure in chamber 2 after a time $t_{pump}$ has lapsed and, therefore, after an amount of water preset has been fed to chamber 2. After said time $t_{pump}$, pump 7 is stopped and the pressure holding step is started for a time $t_1$. At the end of time $t_1$, i.e. at the end of the pressure holding step, that will last for another time period $t_1$, e.g. 20 seconds, pump 7 is started again and chamber 2 is opened. At the end of the beverage dispensing step, operation of pump 7 is discontinued and valve 15 switched to connection with drip tray 16.

Figure 3:
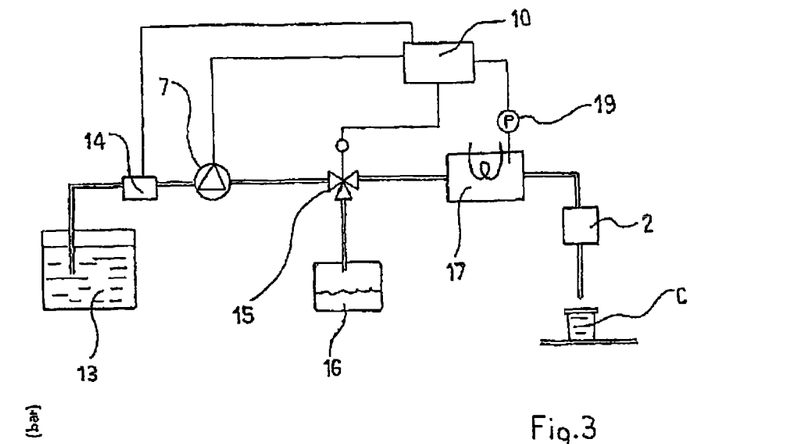
FIG. 3 is a further schematic layout of an apparatus according to the invention.

The embodiment shown in FIG. 3 is almost corresponding to the embodiment of FIG. 2 and the same references will be used for the same components of the apparatus. The difference with respect to the embodiment of FIG. 2 lies in the use of a pressure detector 19 and switch mounted at the inlet of water heater 17 so as to detect the pressure in chamber 2.

The operation of this embodiment is similar to the method disclosed with reference to FIG. 1; with valve 15 open, pump 7 is started, water is fed to heater 17 and from it to preparation chamber 2, that is in a closed condition. Once the pressure detector 19 senses that the first pressure, i.e. the pressure to be used in pressure holding time, has been reached it generates a signal to switch off, directly or through control unit 10, the pump 7.

After the required time $t_1$ (e.g. 25 seconds) has lapsed, i.e. at the end of pressure holding step, pump 7 operation is resumed and the preparation chamber is opened.

Figure 4:
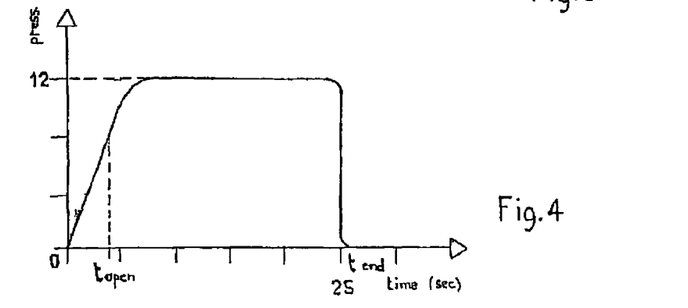
FIGS. 4 and 5 are pressure diagrams showing the pressure values of the hydraulic circuit in a traditional extraction process and in an embodiment of the process according to the present invention.
Figure 5:
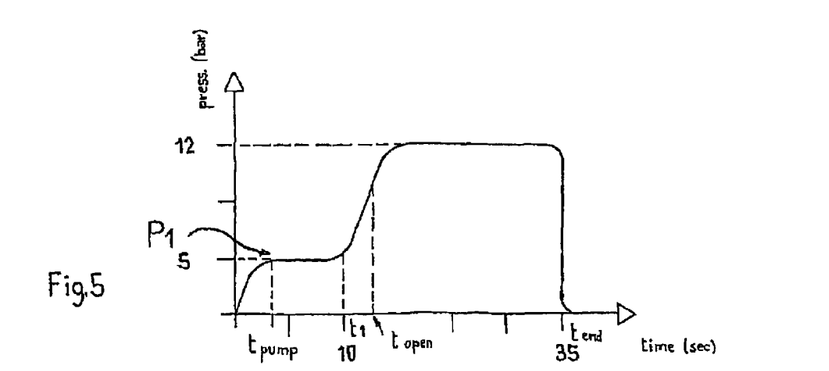

FIGS. 4 and 5 graphics schematically show the pressure profile of a known process (FIG. 4) and of the process according to the invention. These graphs are simplified to better illustrate the steps of the method of the invention.

In FIG. 4 the pressure increases with time until the chamber is opened at time=$t_{open}$; the pressure then reaches the pressure of delivery of the beverage and usually remains substantially constant (with minor differences according to the ingredient used and the rate of its water adsorption) until the end of the dispensing cycle when the pump is stopped at $t_{end}$.

As shown in FIG. 5, the invention provides for reaching a first pressure P1 (5 bar in this figure) at time $t_{pump}$ and for holding this pressure P1 until time $t_1$ is reached. The holding time of pressure P1 is $t_1-t_{pump}$. In the shown preferred embodiment the pressure is again increased by resuming water feeding to the chamber, until time $t_{open}$, when the chamber is opened. The remaining part of the beverage preparation process, i.e. the beverage dispensing step, is substantially identical to the corresponding beverage dispensing step in FIG. 4, until the end of the process at $t_{end}$.

Figure 8:
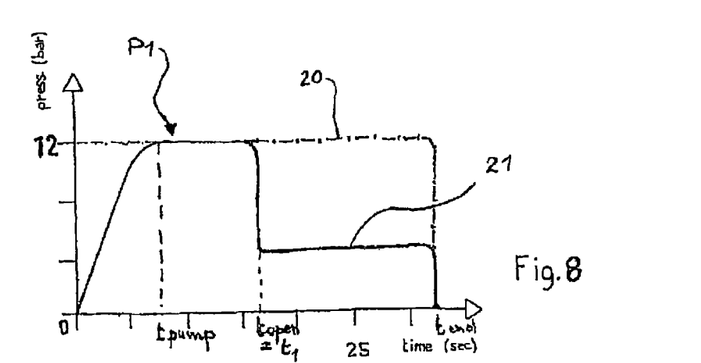

FIG. 8 shows other two ways of carrying out the invention method. In both embodiments the first pressure is reached and at $t_{pump}$ the pump 7 is stopped or the flow is interrupted through valve 15. Instead of resuming the flow of water to the preparation chamber 2 at time $t_1$ and increasing the pressure until opening the preparation chamber at time $t_{open}$ in these embodiments there is no increase of pressure: $t_1$ corresponds to $t_{open}$, i.e. $t_1=t_{open}$ and the flow is resumed substantially at the same time of the opening of the preparation chamber.

The pressure can remain substantially constant until the end of the delivery of the beverage, as is shown in the dot and dash line 20, or can be lowered at the opening of the cartridge, as shown with line 21. In the second case the amount of foam obtained in the coffee is very high.

Figure 6:
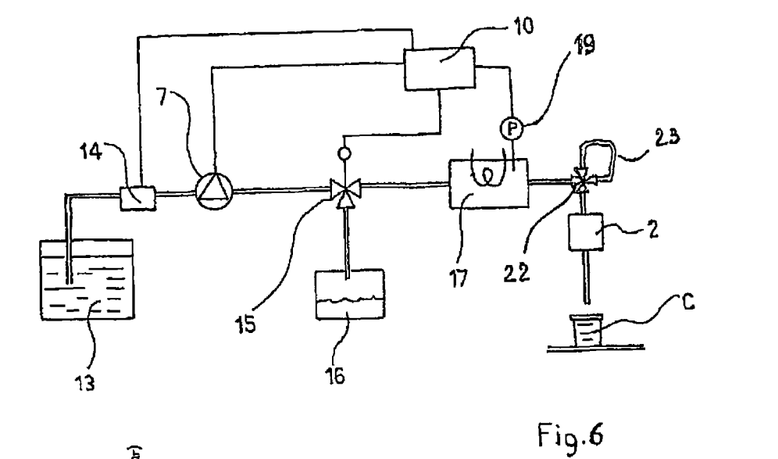
FIG. 6 is a schematic layout of another apparatus according to the invention.
Figure 7:
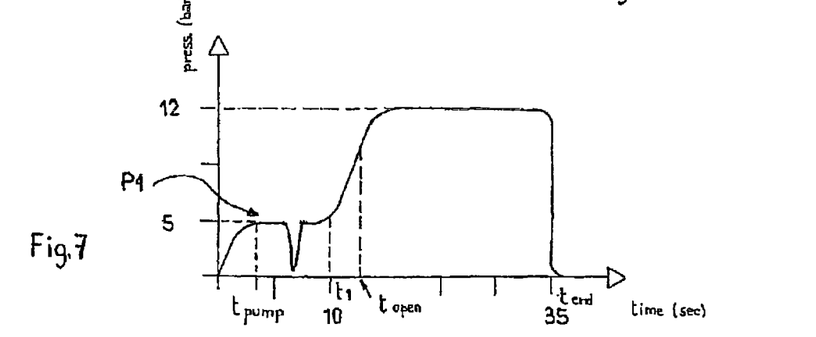
FIGS. 7-8 are pressure diagrams showing the pressure values of the hydraulic circuit in further embodiments of the process according to the present invention.

FIGS. 6 and 7 show a scheme of a further apparatus of the invention and a graph showing the pressure profile that can be obtained with the apparatus of FIG. 6. FIG. 6 is largely corresponding to the apparatus of FIG. 3; in addition to said features, the apparatus of FIG. 6 comprises a means of reducing the pressure in the closed preparation chamber 2 during the pressure holding step $t_{pump}-t_1$. The resulting pressure profile is shown in FIG. 7.

The pressure drop is obtained by means of valve 22 and an expansion body 23 located upstream preparation chamber 2, preferably between chamber 2 and boiler 17. In the shown embodiment, valve 22 is a four-way valve and the expansion body 23 is a loop; other embodiments could be used. The functioning is the following: valve 22 is initially connecting boiler 17 to chamber 2; once first pressure P1 is reached, water flow is interrupted; during the pressure holding time, valve 22 is switched to connect chamber 2 to expansion body 23 and is then switched to connect boiler (or flash-heater) 17 to loop 23 and loop 23 to chamber 2. The circuit is thus brought back to a pressurized condition, if necessary by the use of pump 7. At the end of the pressure holding step, i.e. at time $t_1$, flow to chamber 2 is resumed, pressure increased, chamber 2 is opened and the beverage is dispensed as shown in FIG. 7 graph.

Alternatively, the method could follow one of the ways of controlling pressure in the apparatus above disclosed with reference to FIG. 8.

In another embodiment of the invention, the pressure drop of FIG. 7 is obtained by having a preparation chamber 2 comprising a cylinder and at least one piston and by moving said piston to increase the brewing chamber volume and thus reduce its pressure. Preferably, two pistons are provided, independently operated by corresponding motors.

The invention will now be further disclosed with reference to the following examples.

EXAMPLE 1

Espresso Coffee

Two sets of ten brewing cycles using the following parameters for both brewing cycles were carried out:

a) 7 grams of ground coffee, mainly of Robusta origin (75%)
b) grinding of beans was set to obtain a particle size dimension—expressed as pondered average size—of 412 microns
c) water inlet temperature: 92° C.±2° C.
d) water circuit pressure during dispensing: 12 bars
e) beverage volume: 40 cc The brewing chamber for all coffees was a cartridge of polypropylene block copolymer, for food use, having a flexural modulus of 1400 MPa (ISO 178). This cartridge is commercially available from the present applicant Tuttoespresso—Origgio—Italy. The beverage dispensing time (from opening of the cartridge) was 25 sec.

In the first set of 10 brewing cycles (the reference cycles) the above parameters were used to make ten coffee beverages by means of a standard brewing cycle, i.e. without any pre-brewing step. The cartridges were opened at 10 bar.

In the second set of ten brewing cycles (the invention cycles) a pre-brewing, pressure-holding, step according to the teaching of the present invention was carried out. The beverage preparing process included a pre-brewing step lasting 10 seconds, during which the ground coffee was held at about 5 bars pressure in the closed cartridge brewing chamber, before resuming pressurised water feeding and opening the cartridge at 10 bar pressure.

The beverage dispensing pressure was 12 bar.

The coffees of the set of ten brewing reference cycles and the coffees of the set of ten brewing invention cycles were dried, separately for each coffee of each set, in an oven at 105° C. until no further weight reduction was detected (i.e. until constant weight); the dry residue was then weighted, following the standardised UNI 8309 norm.

In the first set, i.e. the reference set, the calculated average dry residue was 28% (w/w) of the initial coffee amount, in the second set, i.e. the invention set involving a pressurised pre-brewing phase of 10" seconds, the calculated average dry residue was 33% (w/w) of the initial coffee amount, with an average increase of just below 20%.

The above reference test was repeated with another set of ten cartridges, but in this case the cartridges were already opened. No pressure holding step was carried out, to simulate a classic espresso preparation. The dry residue for this extraction was 23% (w/w) to confirm the excellent results of the invention process also with reference to other known methods.

EXAMPLE 2

American Coffee

Two sets of ten brewing cycles using the following parameters for both brewing cycles were carried out:

a) 7 grams of ground coffee, 75% Robusta
b) grinding of beans was set to obtain a particle size dimension—expressed as pondered average size—of 452 microns
c) water inlet temperature: 90° C.±2° C.
d) water circuit pressure during beverage dispensing: 6 bars
e) beverage volume: 110 cc.

The brewing chamber for all coffees was a cartridge of polypropylene block copolymer, for food use, having a flexural modulus of 1400 MPa (ISO 178). This cartridge is commercially available from the present applicant Tuttoespresso—Origgio—Italy. The beverage dispensing time (from opening of the cartridge) was 25 seconds.

In the first set of 10 brewing cycles (the reference cycles) the above parameters were used to make ten coffee beverages by means of a standard brewing cycles i.e. without any pre-brewing phase. the cartridges were opened at 9 bar.

In the second set of ten brewing cycles (the invention cycles) a pre-brewing pressure-holding step according to the teaching of the present invention was carried out. Particularly, the beverage preparing process included a pre-brewing step lasting 15 seconds, during which the ground coffee was held at 9 bar pressure in the brewing chamber, before resuming pressurised water feeding and opening the cartridge at 9 bar pressure. The pressure immediately fell at 6 bar. The beverage dispensing pressure was 6 bar, i.e. lower then the opening pressure.

The coffees of the set of ten brewing reference cycles and the coffees of the set of ten brewing invention cycles were dried, separately for each coffee of each set, in an oven at 105° C. until no further weight reduction was detected (i.e. until constant weight); the dry residue was then weighted, following the standardised UNI 8309 norm.

In the first set the calculated average dry residue had a value of 31%, in the second set, i.e. the invention cycle involving a pressurised pre-brewing phase of 15" seconds, it had a value of 35%, with an average increase of about 13%.

EXAMPLE 3

Camomile Preparation

Two sets of ten brewing cycles were carried out with the following parameters:

a) 2.5 grams of camomile minced flowers
b) water inlet temperature: 85 C.°
c) water circuit pressure during dispensing of the beverage: 5 bar
d) beverage volume: 130 cc
e) beverage dispensing time: 30 seconds.

The brewing chamber was a cartridge as above disclosed.

The first (reference) set of cycles was carried out in the standard traditional way. Cycles of the second set of brewing cycles were carried out with an additional pre-brewing step in which the closed cartridge was kept at 8 bar for 10 seconds before opening the cartridge. The beverage dispensing pressure was 5 bar.

The camomile beverage obtained according to the invention showed an increase in color, taste and dry residue with respect to the camomile extract obtained with the traditional first set of cycles without the pre-brewing pressure-holding step was only lightly colored.

Similarly, increases in the total dry residue value, i.e. an improved extraction, are found when using the invention process with other materials such as tea and other herbal infusions.

As previously mentioned, the invention process makes it possible to improve the extraction process independently of the dispensing pressure. In other words, the opening pressure of the beverage preparation chamber, $P_{open}$, can be set by the user or by the manufacturer, to be higher, identical or lower than the dispensing pressure of the beverage $P_{disp}$, to obtain the desired type of beverage (e.g. with or without foam, etc.) while at the same time improving the extraction of the material.

The opening pressure can be controlled by different means. When the beverage preparation chamber is a cartridge or a pod, the cartridge or pod is rigid and/or is housed in a rigid container to avoid deformation of the cartridge once it is pressurized at the claimed pressure of at least 3 bar, preferably 5 bar, and up to 12 or even 17 bar. Thus, a flexible pod can be used for the present invention, provided that it is housed in a rigid chamber and that the chamber does not have any piercing elements protruding inside it. In other words, the chamber of previously discussed EP0870457 cannot be used with the process of the present invention.

As previously mentioned, according to one embodiment the cartridge is opened by further increasing the holding pressure, e.g. from 5 bar to 12 bar; this will result in the breaking of the wall of the cartridge along the breaking lines that define (in a known way) the opening outlet of the cartridge. Alternatively, the cartridge is opened by a piercing member that is moved by known means to perforate the cartridge wall, preferably from outside to the inside.

In another embodiment, disclosed in copending application PCT/IB2006/003462 in the name of present applicant, the cartridge is opened by a combination of the action of internal pressure and mechanical means that both act on at least one portion of the cartridge projecting from the cartridge wall to push it inside the cartridge when a set pressure is reached. Alternatively, the cartridge is first pressurized and then the mechanical means are biased against the protruding portion to open the cartridge.

In a beverage preparation chamber consisting of a brewing chamber including a cylinder and a piston to house loosely fed material (ground coffee etc.,) the opening is carried out by means of a valve that closes the brewing chamber during the invention pre-brewing pressure holding step. The valve is then opened either by an increase of the pressure within the chamber or by a control means. The invention valve is a piezoelectric valve.

It was found that by controlling the ratio of $P_{open}/P_{disp}$ the final characteristics of the beverage obtained through an infusion, or brewing, process can be controlled. Namely, it was found that when $P_{open} > P_{disp}$ the beverage will give greater bubbles that easily break down: thus, a brewing cycle in which the dispensing pressure is lower than the opening pressure is particularly advantageous when an "American" or frothy coffee (i.e. a high volume coffee) or a camomile and herbal infusions with high extraction are required.

When $P_{open} < P_{disp}$ the resulting beverage will be provided with a compact and uniform top layer of foam or "cream" e.g. resulting from the emulsion of coffee oils during extraction.

The ratio $P_{open}/P_{disp}$ can be set to accordingly control the final beverage characteristics. It is, therefore, an object of the present invention a process for preparing a brewed beverage, comprising the steps of brewing the beverage in a closed beverage preparation chamber, opening said chamber and dispensing said brewed beverage, characterized in that the ratio $P_{open}/P_{disp}$, $P_{open}$ being the pressure at which the beverage preparation chamber is opened and $P_{disp}$ is the pressure at which the beverage is dispensed from said beverage preparation chamber, is set according to the characteristics required for the final beverage. The said ratio generally is within the range of 6:1 to 1:10, preferably 6:1 to 1:6.

The invention claimed is:

1. A process of preparing a beverage, comprising:
   feeding water to a closed beverage preparation chamber until a first pressure (P1) is reached, the closed beverage preparation chamber being a brewing chamber provided with a valve means;
   interrupting at least once the flow of water to said preparation chamber ($t_{pump}$);
   maintaining said preparation chamber in a closed condition at said first pressure (P1) for a pressure-holding time ($t_{pump}-t_1$);
   resuming at least once said flow of water to the said preparation chamber at the end of said pressure holding time ($t_{pump}-t_1$); and
   opening said valve means of the preparation chamber to dispense the thus prepared beverage from an outlet of said preparation chamber, said opening step being carried out by a control unit via a piezoelectric valve.

2. A process according to claim 1, wherein said pressure (P1) is increased at the end of said pressure holding time ($t_{pump}-t_1$).

3. A process according to claim 1, wherein said pressure (P1) is decreased at the end of said pressure holding time ($t_{pump}-t_1$).

4. A process according to claim 1, wherein said pressure (P1) is decreased at least once during said pressure holding time ($t_{pump}-t_1$).

5. A process according to claim 1, wherein said first pressure (P1) is within a range of 3 to 20 bar.

6. A process according to claim 1, wherein said first pressure (P1) is within a range of 5 to 17 bar.

7. A process according to claim 1, wherein said pressure holding time ($t_{pump}-t_1$) is within the range of 1 to 60 seconds.

8. A process according to claim 1, wherein said pressure holding time ($t_{pump}-t_1$) is within the range of 5 to 20 seconds.

9. A beverage dispensing apparatus for carrying out a process of preparing a beverage, said apparatus comprising:
   a beverage preparation chamber;
   means for feeding water to said preparation chamber;
   means for interrupting at least once said water flow to said preparation chamber once a first pressure (P1) is reached;
   means for resuming said water flow after a preset time interval; and
   means for opening said preparation chamber after said time interval has lapsed to provide an outlet for the prepared beverage,
   wherein said preparation chamber is a brewing chamber including a piezoelectric valve to maintain said preparation chamber in a closed condition and at the first pressure (P1) for a preset pressure holding time ($t_{pump}-t_1$) before said preparation chamber is opened, and
   wherein said beverage preparation chamber is a cartridge and said opening means is selected from a piercing element and a means of biasing a portion of the capsule wall.

10. An apparatus according to claim 9, further comprising a control means to operate said interruption, resumption and opening means.

11. An apparatus according to claim 9, further comprising pressure detecting means for detecting a pressure in the preparation chamber.

12. An apparatus according to claim 9, further comprising a timer.

13. A beverage dispensing apparatus for carrying out a process of preparing a beverage, said apparatus comprising:
   a beverage preparation chamber;
   means for feeding water to said preparation chamber;
   means for interrupting at least once said water flow to said preparation chamber once a first pressure (P1) is reached;
   means for resuming said water flow after a preset time interval; and
   means for opening said preparation chamber after said time interval has lapsed to provide an outlet for the prepared beverage,
   wherein said preparation chamber is a brewing chamber including a piezoelectric valve to maintain said preparation chamber in a closed condition and at the first pressure (P1) for a preset pressure holding time ($t_{pump} - t_1$) before said preparation chamber is opened, and
   wherein said beverage preparation chamber is a brewing chamber and comprises at least one piston, a cylinder and a piezoelectric valve.

14. An apparatus according to claim 9, further comprising an expansion element or a double piston system for pressure reduction.

15. An apparatus according to claim 9, wherein the means for feeding water to said preparation chamber includes a pump.

16. An apparatus according to claim 9, wherein the means for interrupting and the means for resuming includes a valve that is closed to interrupt said water flow and opened to resume said water flow.

17. An apparatus according to claim 9, wherein the means for opening said preparation chamber includes a pump configured to feed the water to increase a pressure in the preparation chamber until it opens.

* * * * *